United States Patent [19]
Murata

[11] Patent Number: 5,642,342
[45] Date of Patent: Jun. 24, 1997

[54] APPARATUS FOR CONTROLLING THE ROTATIONAL SPEED OF AN OPTICAL-DISC

[75] Inventor: Tatsuya Murata, Tokorozawa, Japan

[73] Assignee: Teac Corporation, Tokyo, Japan

[21] Appl. No.: 552,285

[22] Filed: Nov. 2, 1995

[30] Foreign Application Priority Data

Nov. 4, 1994 [JP] Japan .................................. 6-271246

[51] Int. Cl.$^6$ ...................................................... G11B 7/00
[52] U.S. Cl. ........................... 369/50; 369/44.26; 369/54
[58] Field of Search ................................... 369/47–48, 50, 369/54, 58, 111, 44.13, 44.26, 44.29, 44.35

[56] References Cited

U.S. PATENT DOCUMENTS

| | | | |
|---|---|---|---|
| 4,542,423 | 9/1985 | Kotake et al. | 369/50 X |
| 4,815,063 | 3/1989 | Aoshima et al. | 369/50 |
| 5,109,369 | 4/1992 | Maeda et al. | 369/50 |
| 5,351,132 | 9/1994 | Sawabe et al. | |

OTHER PUBLICATIONS

Japanese journal, "Rado Technique", for Mar. 1993, pp. 165–180, All of Sony MD (Mini–Disc) Technique.

*Primary Examiner*—W. R. Young
*Attorney, Agent, or Firm*—Michael N. Meller

[57] ABSTRACT

A first servo unit controls a rotational speed of an optical disc using a reproduced signal obtained as a result of reading a signal previously written on the optical disc. A second servo unit controls rotation of the optical disc using a rotation detection signal obtained as a result of measuring a rotational speed of a disc motor which drives the optical disc. A determining unit determines that the second servo unit is to perform a disc-rotation-speed control operation when it is determined that a disc-rotation-speed control operation performed by the first servo unit is not possible. The determining unit determines that the first servo unit is to perform the disc-rotation-speed control operation when the rotation speed of the optical disc is a predetermined one. The optical disc has a plurality of recording regions, the plurality of recording regions having different recording modes for recording signals therein such that a polarity of the reproduced signal relevant in a tracking control operation is different in response to a change of a currently scanned recording region among the plurality of recording regions. The determining unit further changes the polarity of the reproduced signal relevant in the tracking control operation when it is determined that the disc-rotation-speed control operation performed by the first servo unit is not possible.

5 Claims, 4 Drawing Sheets

APPARATUS FOR CONTROLLING THE ROTATIONAL SPEED OF AN OPTICAL-DISC

BACKGROUND OF THE INVENTION

1. Field of the Invention

The present invention relates to an optical-disc apparatus for recording information in and reproducing information from an optical disc, wherein rotational speed of the optical disc is appropriately controlled.

2. Description of Related Art

Recently, the optical discs used as a information recording medium include not only a CD (Compact Disc) and a LD (Laser Disc) but also an MD (Mini Disc). The MD is a recordable and reproduceable magneto-optical disc, which has been developed based on advances in optical modulation technology and magnetic-field modulation technology. The MD has recently come into wide use. The MD is used as a commercial product in public-use as a rewriteable music recording medium.

A system for driving the MD is basically similar to an optical-disc apparatus (magneto-optical-disc apparatus). However, in order to record an amount of information corresponding to 74 minutes on the MD having a diameter of 64 mm, the system additionally performs voice-information compression and includes a memory for preventing problematical skipping of voice information which may occur due to vibration applied to the system.

FIG. 1 shows a block diagram of an optical disc apparatus in the related art. In the optical disc apparatus 11 shown in FIG. 1, laser beams emitted by a pickup 14 are incident on an optical disc 13, which is rotated by a disc motor 12 at a controlled rotational speed. Reflected light is converted into a reproduced signal by the pickup 14. The signal is supplied to a synchronization detecting circuit 16, a PLL (Phase Locked Loop) circuit 17 and a disc servo circuit 19, via an analog waveform-shaping circuit 15.

The PLL circuit 17 compares the reproduced signal supplied by the analog waveform shaping circuit 15 with a reference signal which is generated by an internal oscillator (VCO: Voltage Controlled Oscillator). Thus, a reproduced clock signal for demodulation is generated as a result of causing the reference signal to be in synchronization with the reproduced signal, and is supplied to the synchronization detecting circuit 16, a signal processing circuit 18 and the disc servo circuit 19. The synchronization detecting circuit 16 uses the reproduced clock signal from the PLL circuit 17 so as to process the reproduced signal, and then produces a main signal which is thus in synchronization for each bit with the reproduced clock signal and is transmitted to the signal processing circuit 18.

The signal processing circuit 18 performs the processes of error correction, D-A conversion and so forth on the thus-supplied main signal. During these processes, address information is extracted from the main signal, which information is then supplied to a CPU (Central Processing Unit) 21 via a track-address detecting circuit 20. The signal processing circuit 18 includes a memory for preventing problematical skipping of voice information. This memory stores voice information for several seconds successively and uses the thus-stored information to fill in a blank section of voice information which may occur due to jumping of the pickup due to vibration or the like. Thus, skipping resulting in a lack of voice information can be prevented.

A disc servo circuit 19 produces a servo signal as a result of comparing the reproduced clock signal from the PLL circuit 17 with a reference clock signal generated by a system clock 25, and supplies it to the disc motor for controlling the rotation speed of the optical disc 13 at a Constant Linear Velocity (CLV) such that the linear velocity of a recording/reproducing track of the disc 13 passing in front of the pickup is fixed over all radiuses of the disc 13.

In the MD used only for data reproduction, similar to the CD, all areas have a pit structure. In the MD for both data recording and data reproduction, a read-in area has a pit structure, but each recording area and read-out area has a groove structure. If the optical disc 13 is a rewriteable MD, a pit tracking mode and a groove tracking mode are used for the pit structure and groove structure, respectively. When a tracking operation is performed on the pit structure, a protruding portion on the disc be traced. In contrast to this, when the tracking operation is performed on the groove structure, a recessed portion on the disc is traced. Accordingly, polarity of an error signal used in the tracking operation in the pit tracking mode is inverse of the polarity of the error signal used in the tracking operation in the groove tracking mode. (Such a polarity of the error signal as used in the tracking operation will be referred to as a servo polarity, hereinafter.)

Further, the disc servo circuit 19 performs a servo control for an EFM (Eight-to-Fourteen Modulation) signal when the pit structure is scanned, but performs the servo control for an ADIP (ADdress In Pregroove) signal when the groove structure is scanned. For performing such changing of control, the disc servo circuit 19 produces the servo signal for the disc-rotation-speed control.

The CPU 21 controls a pickup servo circuit 22 which thus uses the reproduced signal from the pickup 14 and thus performs a focus control operation, a tracking control operation and a pickup forwarding/reversing control operation. Further, the pickup servo circuit 22 performs the tracking control operation, where the servo polarity of the tracking error signal is changed as the structure being scanned is changed between the pit and groove structures.

When recording, the signal processing circuit 18 performs the processes of A-D conversion, data (voice information) compression, EFM and so forth and thus supplies a main signal to a head driving circuit 23. A magnetic-modulation recording method is used when recording information in the MD. Accordingly, the recording operation is performed through a head 24 which is located above an upper surface of the optical disc 13. The head driving circuit 23 controls the head 24 for this purpose.

The disc-rotation-speed control according to the CLV is simply the servo control for the EFM signal for the MD for only reproduction because in such type of MD, all of the areas have the pit structure. However, for the MD capable of recording and reproduction, it may be necessary to change the servo control between that for the EFM signal and that for the ADIP signal in response to a change of an area being scanned by the pickup 14.

The pickup will trace a protruded portion on the optical disc 13 in an area of the pit structure, and trace a recessed portion on the disc in an area of the groove structure. The change is performed by appropriately changing the servo polarity of the error signal. If this change is not performed appropriately and thus the servo polarity of the error signal is inverted, a portion of the disc at which no significant signal is recorded is traced by the pickup 14. As a result, no significant signal is obtained.

If the pickup 14 unexpectedly moves to an area of the groove structure, during scanning of an area of the pit structure, due to some cause, the servo polarity of the tracking error signal may not be appropriately changed and also the disc-rotation-speed control may not be appropriately changed from that for the EFM signal to that for the ADIP signal. If the change is not appropriately performed as mentioned above, no significant signal is obtained above and thus disc-rotation-speed control cannot be appropriately performed. In other words, the disc rotation speed is out of control.

As a result, the disc motor 12 drives the optical disc 13 at a high speed. Once the apparatus enters such a situation, if the above-mentioned change is correctly performed, due to responsable frequency bands of the focus servo control operation and tracking control operation and so forth, it is not easy to return the apparatus to a normal state and thus realize a CLV-servo locked state which will be described later.

SUMMARY OF THE INVENTION

An object of the present invention is to provide an optical-disc apparatus which has an improved performance, so as to prevent a situation in which the disc rotation speed is out of control, and in which the disc-rotation-speed control by the CLV is rapidly enabled even if the disc rotation speed is out of the control while in the CLV mode.

An optical-disc apparatus according to the present invention comprises:

first servo means for controlling a rotational speed of an optical disc using a reproduced signal obtained as a result of reading a signal previously written on said optical disc;

second servo means for controlling rotation of said optical disc using a rotational speed detection signal obtained as a result of measuring a rotational speed of a disc motor which drives said optical disc; and determining means for determining that said second servo means is to perform a disc-rotation-speed control operation when it is determined that a disc-rotation-speed control operation performed by said first servo means is not possible, said determining means determining that said first servo means is to perform the disc-rotation-speed control operation when the rotation speed of said optical disc is a predetermined speed.

Thereby, the disc motor is prevented from being driven at an abnormally high rotational speed due to a possible problem occurring in the disc-rotation-speed control operation performed by the first servo means. Further, the disc motor is rapidly returned to a normal rotation state.

It is preferable that:

said optical disc has a plurality of recording regions, said plurality of recording regions having different recording modes for recording signals thereon such that a polarity of the reproduced signal relevant in a tracking control operation is different in response to a change of a currently scanned recording region among said plurality of recording regions; and said determining means further changes the polarity of the reproduced signal relevant in the tracking control operation when it is determined that the disc-rotation-speed control operation performed by said first servo means is not possible.

Thereby, a problem in the disc-rotation-speed control operation occurring due to incorrect selection of the polarity of the reproduced signal relevant in the tracking control operation can be eliminated. As a result, the disc motor is prevented from being driven at an abnormally high rotational speed.

If is further preferable that the disc-rotation-speed control operation, during starting of the rotation of said disc motor, is performed by said second servo means. Thereby, it is possible to effectively reduce the time required for realizing a CLV-servo locked state, which will be described later. Accordingly, the time required for starting up the disc motor 33 can be effectively reduced.

Other objects and further features of the present invention will become more apparent from the following detailed description when read in conjunction with the accompanying drawings.

DESCRIPTION OF PREFERRED EMBODIMENT

Figure 1:
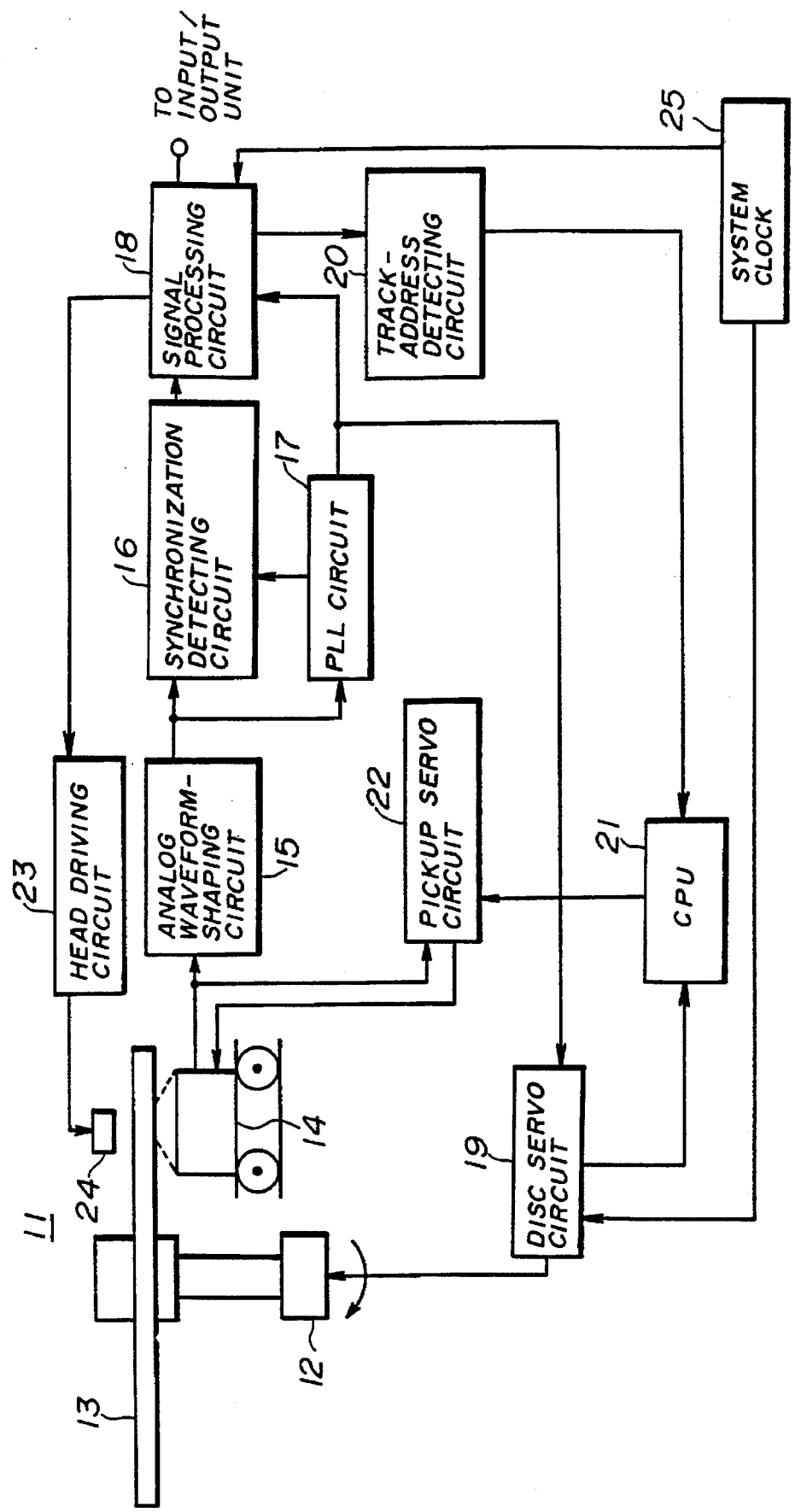
FIG. 1 shows a block diagram of an optical-disc apparatus in the related art.
Figure 2:
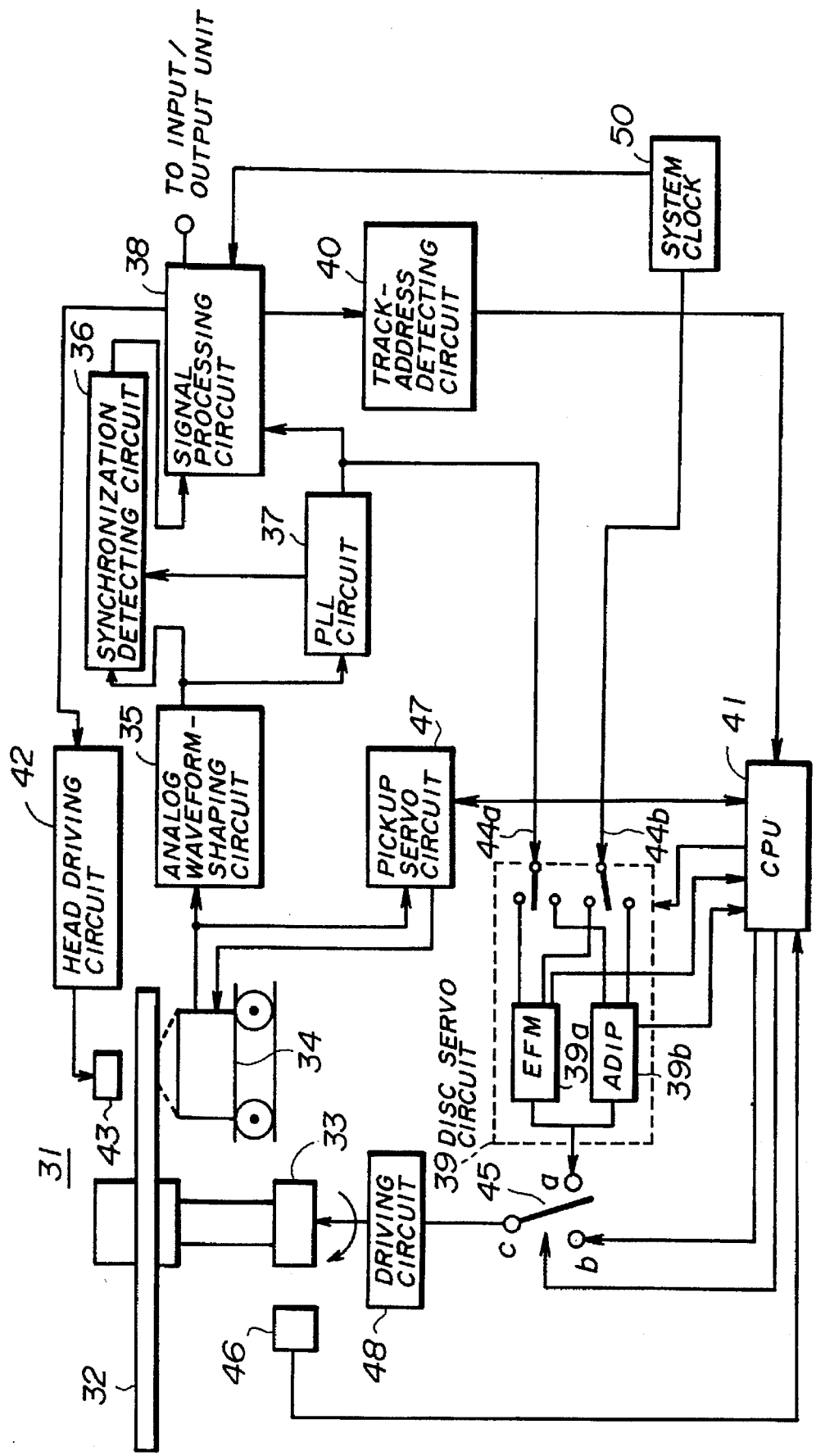
FIG. 2 shows a block diagram of an optical-disc apparatus in an embodiment of the present invention.

With reference to FIG. 2, an embodiment of the present invention will now be described. In an optical disc apparatus 31 shown in FIG. 2, an optical disc 32 is rotated and the rotation is controlled by a disc motor 33. The optical disc 32 has a plurality of recording regions having different recording modes, for example, a pit recoding region (referred to as a pit region) for which information is recorded using unevenness of a recording surface and a groove recording region (referred to as a groove region) in which a track guiding groove is formed on a MO (Magnet-Optical) film.

The optical disc 32 is rotated and the rotation is controlled according to the CLV such that a linear velocity, of a recording/reproducing track of the disc 32 passing in front of a pickup 34, is fixed over all radiuses of the disc 32. (The disc-rotation-speed control according to the CLV is referred to as a CLV servo control.) For the pit region, the above-mentioned servo control for the EFM signal is used, and for the groove region, the above-mentioned servo control for the ADIP signal is used, as the disc-rotation-speed control.

Laser beams emitted by the pickup 34 are incident on the optical disc 32. Reflected light is converted into a reproduced signal by the pickup 34, which signal is supplied to a synchronization detecting circuit 36, a PLL (Phase Locked Loop) circuit 37 and a disc servo circuit 39, via an analog waveform-shaping circuit 35.

The PLL circuit 37 compares the reproduced signal supplied by the analog waveform shaping circuit 35 with a reference signal which is generated by an internal oscillator (VCO). Thus, a reproduced clock signal for demodulation is generated as a result of causing the reference signal to be in synchronization with the reproduced signal, and is supplied to the synchronization detecting circuit 36, a signal processing circuit 38 and the disc servo circuit 39. The state in which the reference signal generated by the VCO is stably in synchronization with the reproduced signal is referred to as a CLV-servo locked state. The CLV-servo locked state can be realized when a frequency of the VCO of the PLL circuit 37 in synchronization with the reproduced signal is very near to a frequency of the reference clock signal of the system clock 50.

When the CLV-servo locked state is realized in the PLL circuit 37, the synchronization detecting circuit 36 uses the reproduced clock signal from the PLL circuit 37 so as to processes the reproduced signal, and then produces a main signal which is thus in synchronization for each bit with the reproduced clock signal transmitted to the signal processing circuit 38.

The signal processing circuit 38 performs processes of error correction, D-A conversion and so forth on the thus-supplied main signal. During these processes, address information is extracted from the main signal, which information is then supplied to a CPU (Central Processing Unit) 41 via a track-address detecting circuit 40. The signal processing circuit 38 includes the memory for preventing problematical skipping of voice information. This memory stores voice information for several seconds and uses the thus-stored information to fill in an information blank which may occur due to jumping of the pickup due to vibration or the like. Thus, skipping or lack of voice information can be prevented.

During information recording, the signal processing circuit 38 performs processes of A-D conversion, data (voice information) compression, EFM and so forth and thus supplies a main signal to a head driving circuit 42. A special recording head 43 is then used for recording relevant information on the optical disc 32 (groove region).

The disc servo circuit 39 includes an EFM servo unit 39a for generating a servo signal for the CLV servo control in the pit region and an ADIP servo unit 39b for generating a servo signal for the CLV servo control in the groove region. Further, the circuit 39 also includes switch circuits 44a and 44b for changing a connection between a connection to the EFM servo unit 39a and a connection to the ADIP servo unit 39b. The servo signal supplied by the disc servo circuit 39 is supplied to an 'a' terminal of a servo change-over switch 45. An appropriate one of the EFM servo unit 39a and ADIP servo unit 39b compares the reference clock signal from the system clock 50 with the reproduced clock signal from the PLL circuit 37. Then, for providing the above-mentioned CLV-servo locked state, the appropriate one of the EFM and ADIP servo circuits 39a and 39b supplies the servo signal and thus controls the rotation speed of the disc motor 33 so as to cause the frequencies of the reference clock signal from the system clock 50 and the reproduced clock signal from the PLL circuit 37 to coincide with one another.

In proximity to the disc motor 33, a sensor (FG: Frequency Generator) 46 for measuring a rotation speed of the disc motor 33 is provided and a detection signal (rotation-speed signal) therefrom is supplied to the CPU 41. The CPU 41, based on the detection signal from the sensor 46, generates a servo signal for causing the disc motor 33 to rotate at a predetermined target speed. The thus-generated servo signal is supplied to a 'b' terminal of the servo change-over switch circuit 45. Using this servo signal, the disc motor is controlled and such a disc-rotation-speed control is referred to as an FG servo control.

The CPU 41, based on the address information from the track-address detecting circuit 40, controls the disc servo circuit 39, switch circuit 44, servo change-over switch circuit 45 and pickup servo circuit 47. A 'c' terminal (common terminal) of the servo change-over switch 45 is used for selectively supplying one of the servo signals supplied to the 'a' and 'b' terminals. The driving circuit 48 amplifies the thus-supplied servo signal and uses the thus-amplified signal for controlling the rotation of the disc motor 33.

The pickup servo circuit 47, based on the reproduced signal from the pickup 34, performs a focus control operation, a tracking control operation and a pickup forwarding/retreating control operation. Further, the pickup servo circuit 47 performs the tracking control operation, where the above-described servo polarity of the tracking error signal is appropriately changed as a region of the optical disc 32 being scanned is changed between the pit and groove regions.

In the optical disc apparatus 31, at a time immediately after power source has been supplied the FG servo control is selected. Further, at a time of an initial state immediately after the optical disc has been loaded in the apparatus 31, the FG servo control is also selected. This selection is performed by, for example, operating the servo change-over switch 45 so that the 'b' terminal is connected to the 'c' terminal. Further, the switch circuit 45 is operated so that the EFM servo unit 39a is initially selected in the disc servo circuit 39, for example. Further, the servo polarity of the tracking control operation in the pickup servo circuit 47 is initially set, which is servo polarity that is used for reproducing data from the pit region.

A reason for initially operating the servo change-over switch circuit 45 so as to cause the 'b' terminal to be selected will now be described. By this selection the FG servo control is selected. As a result, a problematical situation is prevented in which the CLV servo control in the disc servo circuit 39 is out of control due to the servo polarity of the tracking operation control in the pickup servo circuit 47 being erroneously set. A reason for initially selecting the servo polarity of the tracking control operation, which polarity is that used when reproducing data from the pit region, will now be described. This is because each of the optical disc (MD) used only for reproducing information and the optical disc (MD) used for both recording and reproducing information has the pit region in the read-in area.

The servo control of the disc motor 33 in the optical-disc apparatus 31 will now be described.

Figure 3:
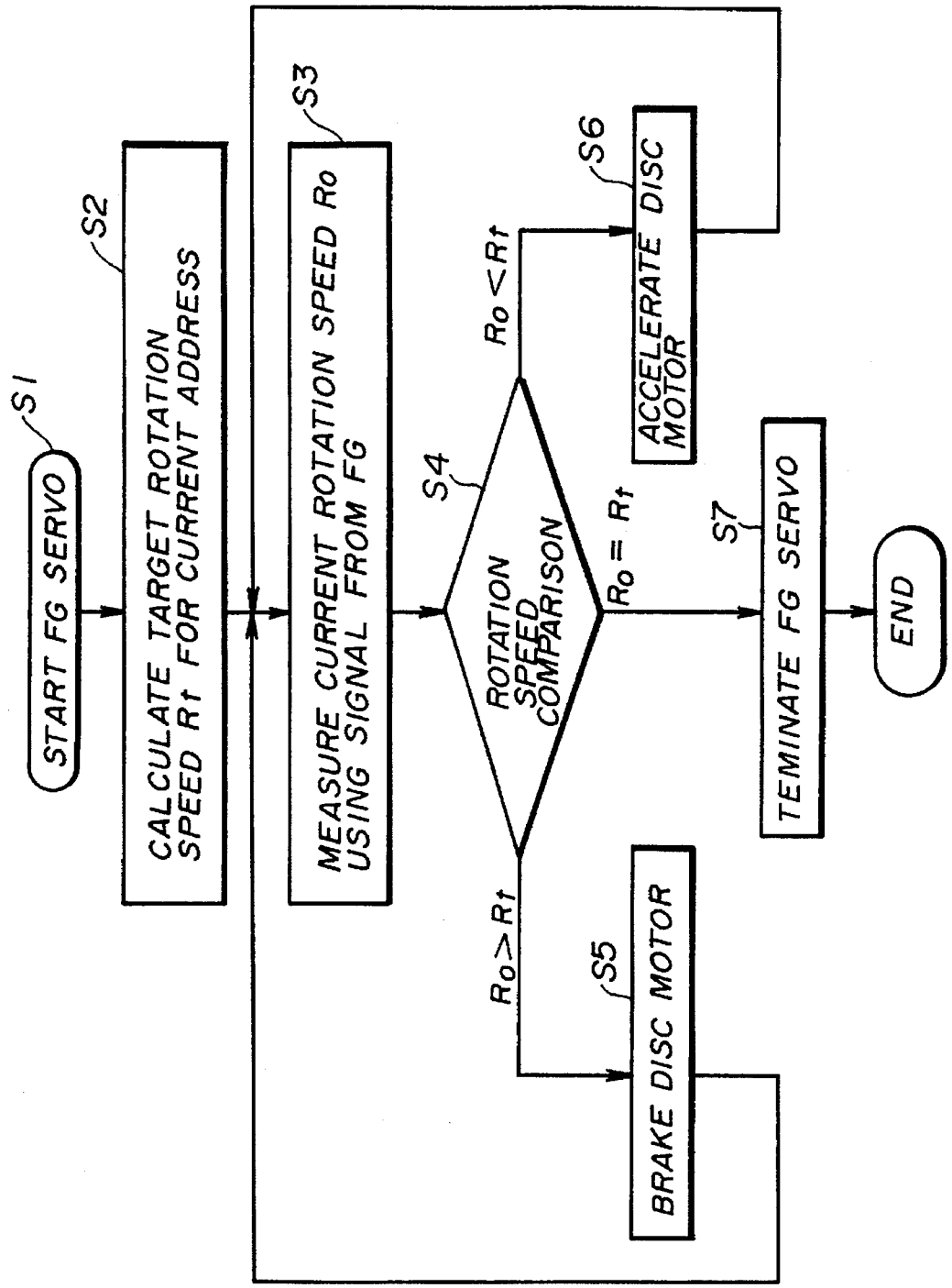
FIG. 3 shows an operation flowchart of an FG servo control operation performed by a CPU in the apparatus shown in FIG. 2.

With reference to FIG. 3, operation of the FG servo control performed by the CPU will now be described. As mentioned above, the FG servo control is performed in the initial state. When the FG servo control is started in step S1 (the term 'step' being omitted, hereinafter), a rotational speed of the disc motor 33, appropriate for an address of the optical disc 32 at which the pickup 34 is currently present, is calculated. The thus-calculated rotational speed is set as a target rotational speed Rt in S2. Then, based on the detection signal from the sensor (FG) 46, a current rotational speed Ro of the disc motor 33 is calculated in S3.

Then, S4 compares the target rotational speed Rt with the current rotational speed Ro. When Ro>Rt, that is, when the current rotation speed is higher than the target rotational speed, a braking signal is supplied and thus the current rotation speed Ro of the disc motor is decreased in S5. Then S3 is again performed. When Ro<Rt, that is, when the current rotation speed is lower than the target rotational speed, an acceleration signal is supplied and the current rotational speed Ro of the disc motor 33 is increased in S6. Then S3 is again performed. When Ro=Rt, that is, when the current rotation speed Ro of the disc motor 33 is equal to the target rotation speed Rt, the FG servo control is terminated in S7.

The FG servo control using the rotation-speed detection signal supplied from the sensor (FG) 46 is thus performed, and then the CLV servo control using the reproduced signal is performed. Thereby, in comparison to a way in which the CLV servo control using the reproduced signal is performed initially, the time required for reaching the above-described CLV-servo locked state and thus the starting time of the apparatus can be effectively reduced.

Figure 4:
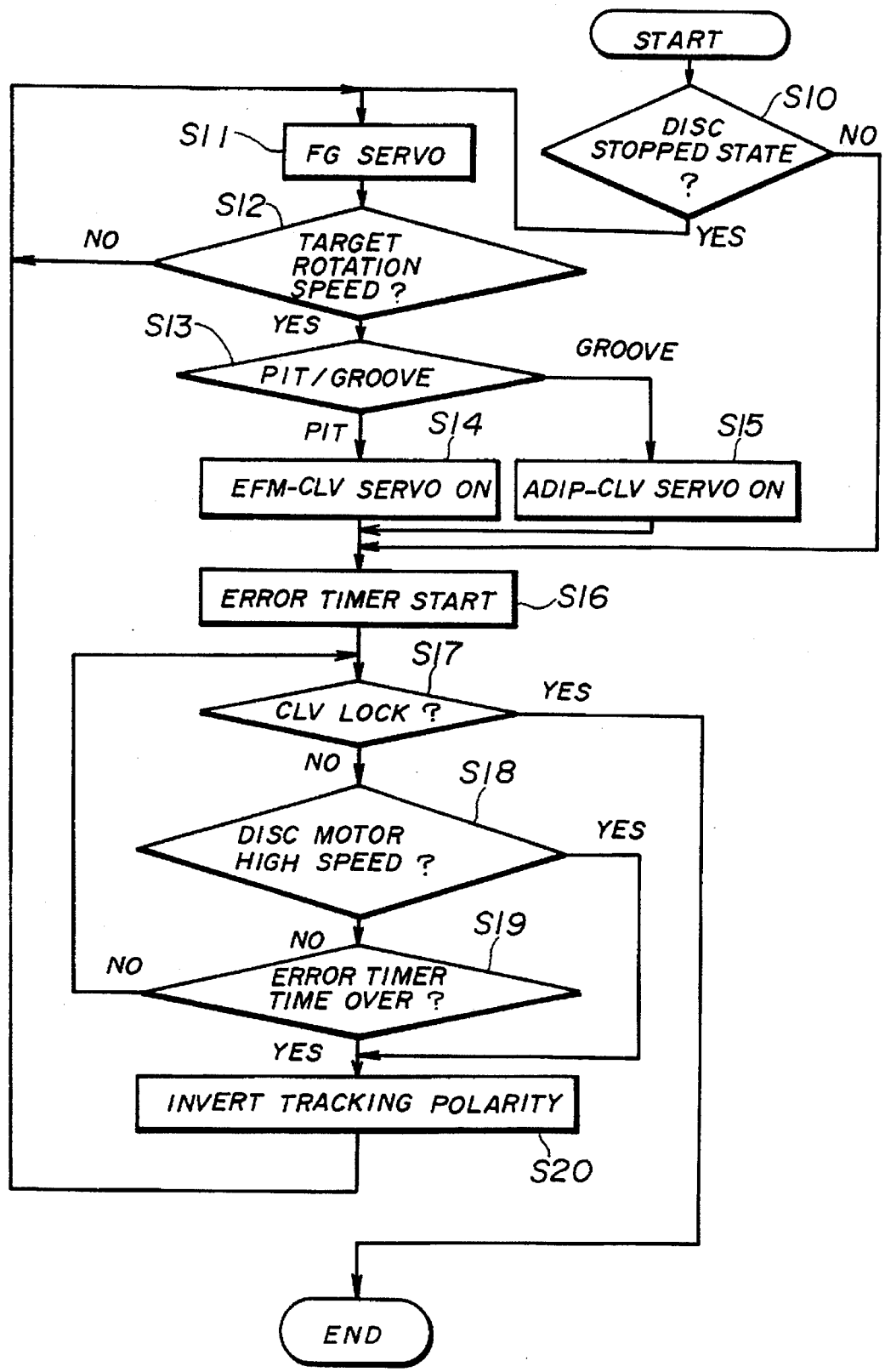
FIG. 4 shows an operation flowchart of an CLV servo control operation performed in the apparatus shown in FIG. 2.

With reference to FIG. 4, an operation of the CLV servo control will now be described. In S10, it is determined whether or not the current operation state is a state in which the disc motor 33 has been stopped. This state includes the above-mentioned initial state. As mentioned above, in a case where it is the initial state, in S11, the above-described FG servo control of the disc motor 33 through the CPU 41 is performed when the optical disc 32 is loaded. Then, in S12, during the FG servo control, based on a signal supplied by the CPU 41 and indicating the above-mentioned target rotation speed Rt, it is determined whether the current rotation speed Ro of the disc motor 33 coincides with the target rotation speed Rt. Thus, the FG servo control is performed until Ro=Rt as described above. The pickup 34 is used for reading out data from the read-in area of the optical disc 32 in the initial state of the apparatus. As a result, the target rotational speed Rt of the FG servo control in the initial state is appropriate for the innermost track of the optical disc 32.

When a rotational speed of the disc motor 33 coincides with the target rotation speed Rt, the CPU 41 operates the servo change-over switch circuit 45 and thus the 'a' terminal is selected. Accordingly, the disc servo circuit 39 is connected to the driving circuit 48. Then, the CPU 41 assumes, in S13, in accordance with the servo polarity of the tracking control operation currently set in the pickup servo circuit 47, whether the current reading region is the pit region or groove region. If the currently set polarity is one appropriate to the pit tracking mode, the currently reading region is assumed to be the pit region in S13. As a result, the CPU 41 sends a control signal to cause the switch circuits 44a and 44b to select the EFM servo control unit 39a, and thus the servo control operation for the EFM signal is performed using the EFM signal (reproduced signal from the analog waveform shaping circuit 35), in S14.

If the currently set polarity is one appropriate to the groove tracking mode, the currently reading region is assumed to be the groove region in S13. As a result, the CPU 41 sends a control signal to cause the switch circuits 44a and 44b to select the ADIP servo control unit 39B, and thus the servo control operation for the ADIP signal is performed using the ADIP signal (reproduced signal from the analog waveform shaping circuit 35), in S15.

However, in the initial state, as mentioned above, the servo polarity of the tracking control operation in the pickup servo circuit 47 is initially set, which servo polarity is that to be used when reproducing data from the pit region. Accordingly, the servo control for the EFM signal is performed in S14. When the servo control operation is started, in S16, the CPU 41 starts measurement of the time required for realizing the CLV-servo locked state by starting operation of an internal timer.

There may be a case in which the current operational state of the disc apparatus is not the initial state. Such a case is where a disc motor 33 has been stopped or the CLV-servo locked state has been canceled due to some cause but the currently loaded disc has not been replaced with another disc. In such a case, each setting of the tracking mode between the groove tracking mode or pit tracking mode by appropriately operating the switch circuits 44a and 44b, and setting of the servo polarity of the tracking control operation in the pickup servo circuit 47 is maintained in the state at which the disc was stopped or the CLV-servo locked state was canceled. The disc motor 33 may be stopped due to an operator erroneously pressing a stop key of the disc apparatus. A predetermined CLV-servo locked state may be canceled due to some external cause or disturbance such as a vibration of the apparatus during a recording/reproduction operation performed on the optical disc 32. In a case where the CLV-servo locked state has been canceled as mentioned above, as the disc motor 33 has not been stopped, a result of S10 is NO, and then S16 is started as shown in FIG. 4.

During the CLV servo control operation, the CPU determines in S17 whether or not the CLV-servo locked state is realized. Each of the EFM servo unit 39a and ADIP servo unit 39b sends a lock detection signal when the CLV-servo locked state is realized and thus the frequencies of the reference clock signal from the system clock 50 and the reproduced clock signal from the PLL circuit 37 stably coincide with one another. Thereby, the CPU 41 can determine whether or not the CLV-servo locked state is realized. If the CLV-servo locked state is realized, an operation of reading the read-in area of the disc 32 is started. If the CLV-servo locked state is not realized, the CPU 41 determines, in S18, using the disc-rotation-speed detection signal from the sensor (FG) 46, whether or not the disc motor 33 is driven at a high rotational speed. If the disc motor 33 is driven at the high rotational speed, the CPU 41 determines in S19 whether or not a time measured by the internal timer, the operation of which timer was started in S16, exceeds a predetermined time. If the measured time does not exceed the predetermined time, S17 is performed.

If S18 determines that the disc motor 33 is driven at the high rotational speed and also S19 determined that the measured time exceeds the predetermined time, it is determined that the servo polarity set in the pickup servo circuit 47 does not correspond to the current reading region of the optical disc 32. Accordingly, S20 causes the servo polarity of the tracking control operation set in the pickup servo circuit 47 to be inverted.

Then S11 performs the FG servo control operation. Thus, the CPU 41 operates the servo change-over switch circuit 45 to select the 'b' terminal and thus the CPU 41 is connected to the driving circuit 48. When the FG servo control operation is finished in S12, the CPU 41 operates the servo change-over switch circuit 45 to select the 'a' terminal and thus the disc servo circuit 39 is connected to the driving circuit 48. Thus, the CLV servo control operation is performed from S13 until the CLV-servo locked state is realized.

Even in a case other than the initial state, when the CLV servo control operation is attempted to be performed after a state in which the disc motor 33 is not rotated, YES is a result of S10 and thus the FG servo control operation is first performed in S11 and after the current rotational speed of the disc motor 33 coincides with the target rotational speed, the CLV servo control using the reproduced signal is performed.

By the operation shown in FIG. 4, the disc motor 33 is prevented from being driven at an abnormally high rotational speed, and the disc motor 33 once driven at a high rotational speed is rapidly returned to a normal rotational state. Further, returning to the normal rotational state is performed by causing the set servo polarity to be inverted. Therefore, a signal-reading disabled state is prevented from occurring and thus the CLV servo control operation is prevented from being out of control.

The present invention is not limited to the above-described embodiments, and variations and modifications may be made without departing from the scope of the present invention.

What is claimed is:

1. An optical-disc apparatus for driving an optical disc having a plurality of recording regions, said plurality of recording regions having different recording modes for recording signals thereon such that a polarity of the reproduced signal relevant to a tracking control operation is different in response to a change of a currently scanned recording region among said plurality of recording regions;

said optical-disc apparatus comprising:

first servo means for controlling the rotational speed of the optical disc using the reproduced signal obtained as a result of reading a signal previously written on said optical disc;

second servo means for controlling rotation of said optical disc using a rotational speed detection signal obtained as a result of measuring rotation speed of a disc motor driving said optical disc; and determining means for determining that said second servo means is to perform a disc-rotational-speed control operation when it is determined that a disc-rotation-speed control operation performed by said first servo means is impossible, said determining means further changing the polarity of the reproduced signal relevant to the tracking control operation in response to impossible first servo means operation determination, said determining means determining that said first servo means is to perform the disc-rotation-speed control operation when the rotational speed of said optical disc is a predetermined rotational speed and the polarity of the reproduced signal is correct.

2. The optical-disc apparatus according to claim 1, wherein the disc-rotation-speed control operation at a starting of the rotation of said disc motor is performed by said second servo means.

3. The optical-disc apparatus according to claim 1, wherein said plurality of recording regions comprises a pit recording region and a groove recording region.

4. The optical-disc apparatus according to claim 3, wherein said first servo means performs the disc-rotation-speed control operation using an eight-to-fourteen modulation signal as the reproduced signal when said pit recording region is scanned, and said first servo means performs the disc-rotation-speed control operation using an address in pregroove modulation signal as the reproduced signal when said groove recording region is scanned.

5. The optical-disc apparatus according to claim 1, wherein said first servo means performs the disc-rotation-speed control operation in a constant linear velocity mode in which a linear velocity of a recording/reproducing track of said optical disc, passing in front of a pickup, is fixed over all radii of said optical disc.

* * * * *